United States Patent Office 2,713,002
Patented July 12, 1955

2,713,002

METHOD OF AGING MEAT

Beverly E. Williams, Hillsborough, Calif., assignor to Lamitex Products, Inc., Redwood City, Calif., a corporation of Delaware No Drawing. Application June 9, 1953,
Serial No. 360,615

13 Claims. (Cl. 99—174)

The present invention relates to an improved method of aging dressed animal carcasses; and more particularly, to an improved method for aging fresh meat in the presence of ultra violet radiation.

The usual treatment of fresh beef, lamb and veal differs somewhat, and, because of the nature of the meat, the problems of chilling and of storage also differ. In the case of beef, it is customary to skin and eviscerate the carcasses on the killing floor, divide the skinned carcasses into sides, cover each side with a heavy brine-soaked shroud cloth and transfer the sides to a cooler to chill the carcass and eliminate the animal heat. The shroud cloth, having served its useful function of smoothing the surface fat, is generally removed the day after slaughter. In the case of veal, the skin is generally left on the carcass until the carcass has been chilled. Veal that is skinned on the killing floor is treated much like beef with the exception that in many cases, the shroud cloth is not employed. Lamb is also treated much like veal, being skinned on the killing floor and generally chilled without the use of a shroud cloth.

In the case of beef, lamb and veal, the carcass (herein and in the claims the term "carcass" will be understood to mean a whole dressed animal body as well as wholesale portions thereof such as sides, quarters, foresaddles and hindsaddles) may be shipped out "green" or may be held in the cooler for the regular aging period, which may be around two or three weeks, to improve the tenderness and flavor of the meat. It has been proposed that, during this aging period, the fresh meat be subjected to ultra violet radiation in order to minimize bacterial growth on the surface of the meat and in order to maintain the atmosphere surrounding the meat, free of bacteria.

It has also been proposed to accelerate the aging of the fresh meat by subjecting the meat to slightly elevated temperatures in the presence of ultra violet radiation. In this case, the slightly elevated temperatures which may range from 35–45° F. to as high as 78–80° F., hasten the tenderizing and improvement in flavor of the meat, the ultra violet radiation minimizing the bacterial contamination as mentioned above. In this accelerated aging process, the time during which the fresh meat is subjected to the elevated temperatures in the presence of ultra violet radiation depends, of course, upon the temperatures employed and upon the degrees of "aging" or "ripening" it is desired to impart to the meat, the rate of "aging" or "ripening" increasing with increase in temperatures. Normally however, the accelerated aging procedure requires the retention of the fresh meat at the slightly elevated temperature in the presence of ultra violet radiation for a period of from about two days to about ten days. After this accelerated aging period, the meat is then shipped out to the trade.

The aging of meat in the presence of ultra violet radiation, either at refrigeration temperatures or under accelerated conditions, has not received wide-spread acceptance for several reasons. In the first place, ultra violet radiation deleteriously affects the red meat and fat on the carcass. With respect to the red meat, it has been found that that which is exposed to the ultra violet radiation is turned dark brown and often black in color. This is believed to be due not only to oxidation by oxygen in the air and by the ozone produced by virtue of the ultra violet radiation, but also to a reducing of the hemoglobin aided by the ultra violet rays themselves. Similarly, the fatty portions of the carcass become yellow and rancid also due to excess oxidation caused by the ozone produced by radiation. Thus, considerable fat and meat must be removed by the butcher before it is ready for sale and such loss constitutes expensive waste. Furthermore, there is a decrease in value due to surface discolorations, and the general quality of the meat, if ony from the appearance standpoint, is lessened. In addition, during accelerated aging at the elevated temperatures dehydration of the meat is also accelerated. Excessive loss of moisture not only means a decrease in weight, but also impairs the quality of the meat.

Many attempts have been made over the past decade to age fresh meat and improve its tenderness and flavor by employing ultra violet radiation with the use of various temperature and humidity combinations, with the view of decreasing or eliminating the deleterious effects on the meat mentioned above. None of these attempts has met with success in spite of the fact that an extremely large amount of money has been expended in the laboratory, in the test cooler, and under actual operating conditions. The maintenance of conditions of high humidity to minimize moisture loss has been found to be expensive and to encourage the formation, on the surfaces and in the crevices of the carcass, of slime—an excellent bacteria and mold-growing medium.

It is a primary object of the present invention, therefore, to provide a method for the aging of meat in the presence of ultra violet radiation by which the above-mentioned deleterious effects are eliminated.

Another object of the invention is to provide a method for the aging of meat in the presence of ultra violet radiation by which discoloration of the meat due to the effect of ultra violet rays, is eliminated.

Another object of the invention is to provide a method for the aging of meat in the presence of ultra violet radiation by which the discoloration and rancidity of the fat due to the influence of ultra violet rays are eliminated.

Still another object of the present invention is to provide a method for the aging of the meat in the presence of ultra violet radiation wherein not only are the deleterious effects on the meat mentioned above eliminated, but wherein other beneficial effects on the meat, such as reduced moisture loss, improved appearance and "bloom," and improved protection from physical rubbing with other objects, are provided.

Further objects will become apparent from a consideration of the following specification and the claims.

In accordance with the process of the present invention, the freshly skinned meat carcass is covered with a unitary wrapper comprising an absorbent material and a moisture-vapor-permeable, pliable, extensile film formed of film-forming organic material adhered together, the moisture-vapor-permeability being provided by minute perforations in the film, the wrapped product being then stored in the presence of ultra violet radiation until the desired degree of aging has been obtained.

It has been found that by storing the freshly skinned meat having the above-described wrapper thereon, in the presence of ultra violet radiation, all the beneficial effects of the ultra violet radiation are realized without the deleterious effects, namely, discoloration of the red meat and of the fat and rancidity of the latter, being encountered. Thus it has been found that the beneficial effects of ultra violet radiation so far as the aging of meat is concerned, are due primarily to the maintenance of the atmosphere of the storage room free from bacteria and not to the direct contact of the ultra violet rays on the surface of the meat. In other words, ultra violet radiation retards bacterial propagation in the air and inhibits the growth of the air-borne micro organisms, but is of little or no value in controlling the development of bacteria already on the surface of the meat. The wrapper described above, not only screens out the rays which would normally deleteriously affect the red meat and fat but in addition effectively controls the development of bacteria already on the surface of the meat in a manner to be discussed more in detail hereinafter. The wrapper also prevents excessively ozonized air from coming into contact with the meat product and in this way also eliminates excessive oxidation of the red meat and fat. In fact, because of the limited amount of oxygen gaining access to the red meat it actually is improved in color and bloom. It will be noted that the wrapper comprises a unitary sheet-like product comprising two main components, namely an absorbent material and a moisture-vapor-permeable organic film, minute perforations of the film providing the moisture-vapor-permeability. Such a wrapper may be readily and easily applied to the meat body. Air which would normally be entrapped between the meat and the wrapper readily escapes through the perforations, thus obviating the formation of air spaces between the wrapper and the meat which would normally result in the formation of slime and ultimately excessive mold growth.

In accordance with the preferred procedure of the present process, the wrapper is first soaked in a solution containing a bactericidal agent. Since the wrap described above, through its combined wicking and breathing action, closely approximates the normal function of the animal's skin, undue moisture loss is not encountered and the wrap may, therefore, be left on the meat until it is delivered to the butcher or even to the ultimate consumer. This procedure is to be distinguished from the present use of shroud cloth which has to be removed within a day or two from its application because of its tendency to wick moisture from the meat and release it readily to the atmosphere. The net result of all this is that the wrapper provides a sterile blanket over the meat from the time the carcass is skinned through the aging process. This not only yields a meat product substantially free of harmful surface bacteria, but also results in improved appearance and flavor in the meat as well as reduced moisture loss during the aging procedure. The combined wicking and breathing action of the wrap also prevents formation of slime on and in the crevices of the carcasses at various humidities which may be encountered during aging.

Referring more particularly to the meat wrap described above, such a meat wrap is disclosed and claimed in co-pending application of Carleton S. Francis, Jr., Serial Number 204,480, filed January 4, 1951, as a continuation-in-part of application Serial Number 52,423, filed October 1, 1948, now abandoned. As there disclosed, the organic film portion of the wrap in addition to being moisture-vapor-permeable, pliable and extensile, should also be substantially odorless and tasteless and should be water-resistant, that is, the physical characteristics of the organic material from which the film is formed should be substantially unaffected by water.

The film may be formed from any organic film-forming material which will provide a film having the stated properties. Thus, the film may be formed from natural elastomers; cellulose esters and ethers; or synthetic resinous material. Preferably, the film is formed from synthetic resinous material and in many instances, the use of a polyvinyl type of resin will be found to be particularly advantageous. Examples of such resins are polyethylene, polyvinyl halides (typified by polyvinyl chloride), polyvinyl esters of the lower aliphatic acids (typified by polyvinylidene chloride) and the polyvinyl materials exemplified by polyvinyl formal, polyvinyl acetal, and polyvinyl butyral. Of especial advantage for use are the copolymers of polyvinyl chloride and polyvinyl acetate or of polyvinylidene chloride and polyvinyl chloride. Other examples of synthetic resinous materials that are applicable for use are the polyesters of acrylic and methacrylic acid such as methyl methacrylate resin, the film-forming polyamide (nylon type) resins, polyisobutylene (butyl rubber) butadiene-acrylonitrile, butadiene-styrene and polyisoprene. Examples of natural elastomers are latex, natural rubber, the hydrochlorinated derivatives thereof, and chlorinated rubber. Examples of the cellulose esters and ethers are cellulose acetate, nitrocellulose, and ethyl cellulose. As is well known and as will be seen from the foregoing, the terms "synthetic resinous material" and "synthetic resin" used herein include synthetic elastomers.

The thickness of the organic film adhered to the absorbent material may be of any desired thickness but in most instances it will be in the neighborhood of ½ to 2 mils in thickness.

As stated, the required moisture-vapor-permeability of the wrap is provided by minute perforations or "pin holes" in the organic film, and the minute perforations in the film will advantageously provide a moisture-vapor-permeability, or moisture-vapor-transmission rate, when measured according to the Technical Association of the Pulp and Paper Industry standard method T448–m–46, of between 0.25 and 2.75 grams, preferably between 0.7 and 2.0 grams, per 50 square centimeters per 24 hours at room temperature, said standard method being modified by providing a 100% relative humidity differential and static air conditions, and with the desiccant-containing dishes in an upright position, in order more closely to simulate actual conditions in use.

The film employed possesses stretch characteristics equal to or greater than that of the absorbent material so that pulling and stretching of the composite wrap tightly around and over the carcass does not result in separation of the film from the absorbent material. The composite structure is advantageously of such a nature that the color of the meat will be visible at least in part, especially when the wrap is wet.

The absorbent material, which comprises absorbent fibres, for example, cotton, rayon, paper, and the like, in the form of a woven, knitted, netted, or unwoven fabric such as a felt, web, bat, paper, and the like is adhered to the organic film to form the unitary product. The material referred to herein as the "absorbent material" will be sufficiently absorbent, as distinguished from non-absorbent plastic films, cellophane, oiled paper, and the like, to provide wicking action, and other characteristics referred to herein. Advantageously, the absorbent material of the wrap will be capable of retaining at least 30% and preferably at least 40% moisture, based on the bone dry weight of the wrap when the wrap is soaked in water and then hydroextracted at a peripheral speed of 3,250 feet per minute for two minutes, the hydroextractor having a diameter of 5 inches. The upper limit of water retention of the absorbent material is not important and it is determined by the type of absorbent material employed. Usually, however, the absorbent material employed will not have a water retention in excess of about 120%, preferably not in excess of 100%, based on the bone dry weight of the wrap when the wrap is soaked in water and hydroextracted as described above.

Referring further to the structure of the meat wrap, the absorbent material is preferably a woven fabric and since the weight of the cloth determines the cost thereof, it will be advantageous to use as light and inexpensive a cloth as possible which possesses the desired characteristics. Generally, a fabric of a conventional weave construction weighing between 2 and 9 yards to the pound, and preferably one weighing between 3 and 8 yards to the pound, will be employed. It is to be understood, however, that any absorbent material possessing the desired characteristics, including other woven fabrics, as well as knitted, netted, and unwoven fabrics, for example, a felt web, bat, or paper, may be used, if desired. The absorbent material should be substantially free from size and hence it may be necessary to de-size the material before the organic film is adhered to the absorbent material. The fibres comprising the absorbent material may be cotton, rayon, paper, or other absorbent fibres. The strength of the absorbent material will be adequate so that the unitary product can be stretched tightly about the meat carcass.

The organic film may be formed in any desired manner, for example, separately from the absorbent material and thereafter adhered thereto or it may be formed in the presence of the absorbent material. Likewise, the minute perforations or "pin holes" may be placed in the film during its preparation or subsequently.

In one embodiment, the resin, for example, a copolymer of 95% polyvinyl chloride and 5% polyvinyl acetate, is applied as a plastisol or organisol in accordance with well-known procedures. For example, the resin may be suspended in a plasticizer with or without a dispersing agent serving as a diluent to form the plastisol or organisol. The resulting mixture may then be ground in a ball mill placed on a carrier and heated to a temperature to cause the resin particles to flow into each other. While the resin is in this flowable condition, it may be transferred to the absorbent material by bringing the material into contact with resin in the flowable condition, preferably under slight pressure. After the film is cooled, the carrier may be removed and the film will be adhered tenaciously to the absorbent material. Instead of applying the plastisol or organisol to the carrier, it may be applied directly to the absorbent material which may then be heated to the temperature where the resin particles flow together to form the film.

In the usual procedure in the production of a film from a plastisol or organisol, a continuous, impermeable film is desired and, therefore, care is taken during the preparation of the plastisol or organisol to remove the air that is present therein prior to the deposition of the suspension of resin. In contrast to this procedure, in forming the film for the wrap described above where minute perforations or "pin holes" are desired in the film, the air is not removed, and, in fact, air may be added to the suspension, if desired. Hence, when the film is formed, the film will not be continuous or impermeable as is customary, but will be provided with the minute perforations or "pin holes" necessary to impart to the film the desired moisture-vapor permeability.

In another procedure in forming the film, the film may be cast from a solution of the film-forming material in an organic solvent. The film is advantageously cast on a carrier and is then transferred from the carrier to the absorbent material, either before the solvent is completely evaporated and while the film is adhesive or after the solvent has been evaporated. In the latter case, the adherence to the absorbent material may be brought about by applying a solvent for the organic material of the film to the absorbent material or to the film. Advantageously, however, when the organic material from which the film is formed is thermoplastic, the film is brought into contact with the absorbent material and the assembly is then heated, preferably under pressure, until the film becomes tacky and hence adheres to the absorbent material. When the solvent (if used) has evaporated or when the assembly of film and absorbent material has cooled, the carrier is removed from the film.

In place of using a cast film, a calendered film may be used in which case it may be adhered to the absorbent material by a solvent, or, when thermoplastic, by heat, preferably with pressure, by procedures analogous to those described above in connection with the cast film.

In the preparation of the product from the cast or calendered film, as above-described, the required minute perforations or "pin holes" may be formed therein during the preparation of the film or during the adherence of the film to the absorbent material, for example, the pressure applied to effect adherence may cause minute breaks in the film at the points of yarn crossings when the absorbent material is a woven material. In any case, when the film is impermeable or does not have the required number of minute perforations or "pin holes" to provide the moisture-vapor-permeability desired, the film, either before or after its adherence to the absorbent material may be perforated, for example, by a mechanical or an electronic perforator.

In another procedure, the absorbent material may be coated by means of a standard type coating machine where a doctor blade applies the resin in the form of a solution to the absorbent material. In this instance, the doctor blade may be adjusted so that the points of yarn crossings are not covered with the resin, thus providing the minute perforations or "pin holes." On the other hand, if the absorbent material is coated with a continuous coating, the required number of minute perforations or "pin holes" may be provided therein, for example, by a mechanical or electronic perforator.

Another method of preparing the film is disclosed and claimed in co-pending application of Talbot A. Lancaster, Serial Number 71,461, filed January 18, 1949. In accordance with the process there disclosed and claimed, a suspension of the organic film-forming material is applied to a moving surface, and then transferred to a second moving surface which is moving in a direction opposite to first moving surface, by pressure exerted between the two surfaces. The linear speed of movement of the second moving surface is greater than the linear speed of movement of the first moving surface thus forming a porous pasty sheet which is then heated to form the porous film.

It is to be understood that, if desired, other materials, for example, dyes, pigments, or reducing agents, may be incorporated in the film or in the absorbent material. When a pigment is incorporated in the film, the normal translucency of the product will be destroyed and, hence, the color or appearance of the carcass will not be visible through the product. If desired to render the film pliable during the conditions of use by the product, for example, in the cold at a temperature of 30° to 35° F., plasticizers may be incorporated therein as is well known in the art.

Referring further to the process of the present invention, the freshly skinned carcass is covered with the described meat wrap. In the case of beef, lamb and hot-skinned veal, the wrap is applied to the carcass while the meat is still warm, usually on the killing floor. In the case of "cold-skinned veal," that is, veal which is chilled with the skin left on, the skin being removed after chilling, the wrap may be applied in the cooler after the skin has been removed from the chilled veal carcass. In applying the wrap, no difficulty will be encountered since the procedure is similar to that involved in the application of the shroud cloth. The wrap is placed over the outer fat surface and smoothed into place so that there are no air pockets between the meat and the wrap. Because of the strength of the wrap, it may be stretched tightly around the meat to form a snug binder therefor. Preferably before applying the wrap, it is soaked in an aqueous solution containing a bactericidal agent, such as the usual brine solution having a 5–20° salometer reading at 60° F. In applying the wrap, either the film surface or the absorbent material surface may be placed in contact with the carcass and advantageous results are obtained in both instances. When the maximum wicking action is desired, the absorbent material is placed in contact with the carcass and, on the other hand, when maximum adhesion is sought, the film surface will be applied to the carcass. When lamb carcasses are covered, it is often desirable to place the absorbent surface in contact with the carcass because the absorbent layer will tend to absorb the wooly, oily fluid on the surface fell and thereby improve the marketability and flavor of the meat. The wrap is tightly and smoothly applied to the skinned surface and fastened thereon by such means as pins, wood skewers, sewed string stitches, string ties, thermoplastic seals, self-binding tapes, and the like.

The covered meat, if it has not already been chilled with the removal of body heat, as would be the case with cold-skinned veal, is removed to the cooler in which a temperature of about 30-35° F. is maintained. In the cooler, the meat gradually chills with the elimination of animal heat and reaches a temperature approximately that of the cooler in a period of about 24 to 72 hours. If the meat is to be aged at this temperature, in the presence of ultra violet radiation, the cooler may be equipped with ultra violet lights or the chilled carcass may be transferred to another room maintained at the desired temperature and equipped with ultra violet lights. If the meat is to be subjected to accelerated aging, at slightly elevated temperatures, that is, temperatures ranging from 35° F., more often from 40° F. up to about 80° F., in the presence of ultra violet radiation, the chilled carcass may be removed from the cooler and transferred to another room maintained at the desired temperature and equipped with ultra violet lights. In any event, at least before substantial aging has taken place, the carcass will have been chilled to less than 50° F., usually around 30-35° F. As stated, further aging may take place at this temperature or at the elevated temperatures and in any case, in accordance with the process of the present invention, aging will take place in the presence of ultra violet radiation.

Referring particularly to the aging step, the temperatures as stated, may range from as low as about 30° F. to as high as about 80° F. The time required will, of course, depend upon the particular temperature conditions employed, and upon the extent of "aging" or "ripening," that is, the degrees of tenderizing and flavor improvement desired. In any event, the selection of the particular time under the conditions obtaining and the result desired is well known in the art. The ultra violet radiation will be supplied from an artificial source of the type well known. The artificial lamps employed may vary widely as to shades and candle power and may be incandescent lamps as well as fluorescent tubes. In the case of fluorescent tubes, shades ranging from hard, bright white to soft white may be employed. The intensity and wave length of the ultra violet radiation may also vary, being sufficient to maintain the atmosphere in the aging chamber substantially free of bacteria and advantageously the radiation possesses wave lengths within the range between about 2100 angstrom units and about 3100 angstrom units. The preferred range of wave length is from about 2500 angstrom units to about 2600 angstrom units, a wave length of from about 2530-2540 angstrom units being recommended.

After the desired aging period has elapsed, the wrapped meat product may be removed from the aging room and shipped or otherwise handled as is customary.

Many tests have been made following the above-described process in which carcasses, sides, and other wholesale portions of fresh beef, lamb and veal, were covered with the described wrap and held under ultra violet radiation of primarily 2537 angstrom units for 5, 10, 15 and 20 days at between 30-40° F., and for 5 and 10 day periods at 47° F., and for periods of 2, 3 and 5 days at 60° F., and for periods of 1 and 2 days at 70° F. These were checked for color deterioration and for flavor and aroma and were compared with control specimens, that is, fresh meat not wrapped in the above-described meat wrap. In all cases, where the fresh meat had been covered with the described wrap, no discoloration of the meat or fat occurred, while the red meat of the control specimens turned dark brown to black and the fat thereof turned yellow and rancid and reeked with odor of ozone.

Considerable modification is possible in the selection of conditions of aging, as well as in the selection of the various component parts of the wrap without departing from the scope of the invention.

I claim:

1. An improved process for aging freshly skinned meat carcasses which comprises storing said carcass in the presence of ultra violet radiation, said carcass being wrapped in a unitary wrapper comprising an absorbent material and a moisture-vapor-permeable, pliable, extensile film formed of film-forming organic material adhered together, said film having a moisture-vapor-permeability due to minute perforations therein of between about 0.25 and about 2.75 grams per 50 square centimeters per 24 hours at room temperature and 100% relative humidity differential.

2. The process of claim 2 wherein said wrapper is wet with an aqueous solution of a bactericidal agent and wherein said absorbent material has a water-retention of at least 30% when the wrapper is soaked in water and hydroextracted at a peripheral speed of 3,250 feet per minute for two minutes, the hydroextractor having a diameter of 5 inches.

3. The process of claim 1 wherein said film-forming organic material comprises a synthetic resin.

4. The process of claim 3 wherein said synthetic resin comprises a vinyl resin.

5. An improved method for treating freshly skinned warm meat carcasses which comprises covering said warm carcass with a unitary wrapper comprising an absorbent material and a moisture-vapor-permeable, pliable, extensile film formed of film-forming organic material adhered together, said film having a moisture-vapor-permeability, due to minute perforations therein, of between about 0.25 and about 2.75 grams per 50 square centimeters per 24 hours at room temperature and 100% relative humidity differential; chilling said wrapped carcass, and storing said wrapped carcass at a temperature above about 30° F. in the presence of ultra violet radiation possessing a wave length between about 2100 and about 3100 angstrom units.

6. The process of claim 5 wherein said wrapper is wet with an aqueous brine solution when it is applied to said carcass, and wherein said absorbent material has a water retention of at least 30% when the wrap is soaked in water and hydroextracted at a peripheral speed of 3,250 feet per minute for two minutes, the hydroextractor having a diameter of 5 inches.

7. The method of claim 5 wherein said film-forming organic material comprises a synthetic resin.

8. The method of claim 7 wherein said synthetic resin comprises a vinyl resin.

9. An improved method for treating freshly skinned warm meat carcasses which comprises covering said warm carcass with a unitary wrapper, comprising an absorbent material and a moisture-vapor-permeable, pliable, extensile film formed of film-forming organic material adhered together, said film having a moisture-vapor-permeability, due to minute perforations therein, of between about 0.25 and about 2.75 grams per 50 square centimeters at room temperature and 100% relative humidity differential; chilling said wrapped carcass, and storing said wrapped carcass at a temperature between about 35 and about 80° F. in the presence of ultra violet radiation possessing a wave length between about 2100 and about 3100 angstrom units.

10. The process of claim 9 wherein said wrapper is wet with an aqueous solution of bactericidal agent when it is applied to said warm carcass.

11. The process of claim 9 wherein said wrapper is wet with an aqueous brine solution when it is applied to said warm carcass.

12. The method of claim 9 wherein said film-forming organic material comprises a synthetic resin.

13. The method of claim 12 wherein said synthetic resin comprises a vinyl resin.

References Cited in the file of this patent

UNITED STATES PATENTS

| | | |
|---|---|---|
| 2,076,053 | Williams et al. | Apr. 6, 1937 |
| 2,106,808 | Murphy et al. | Feb. 1, 1938 |
| 2,135,901 | Lea | Nov. 8, 1938 |
| 2,237,277 | Williams et al. | Apr. 1, 1941 |
| 2,314,300 | Williams et al. | Mar. 16, 1943 |
| 2,407,549 | Gurwick | Sept. 10, 1946 |